April 9, 1929.  B. G. GOBLE  1,708,015
ARTIFICIAL BAIT OR FROG
Filed Nov. 1, 1924  2 Sheets-Sheet 1
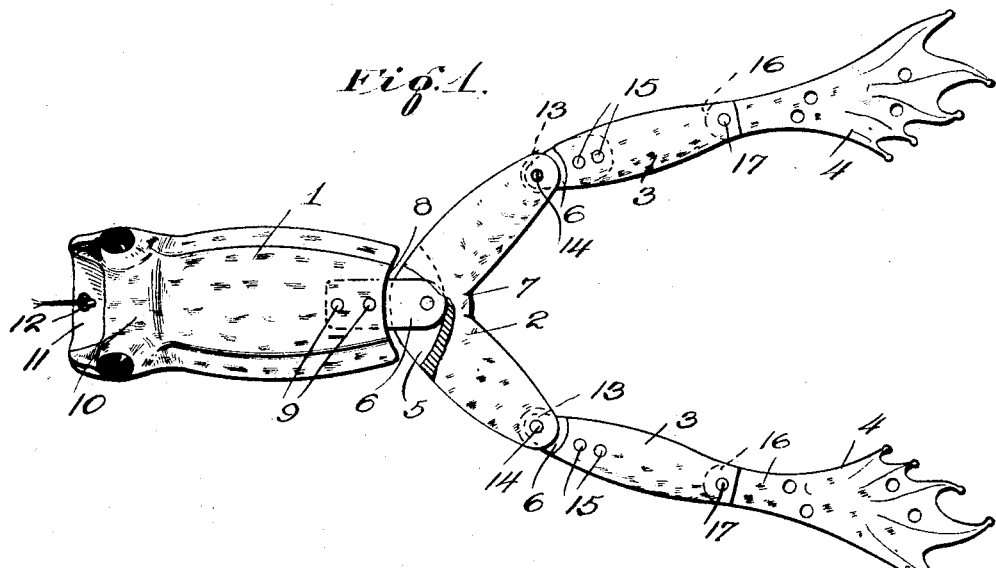
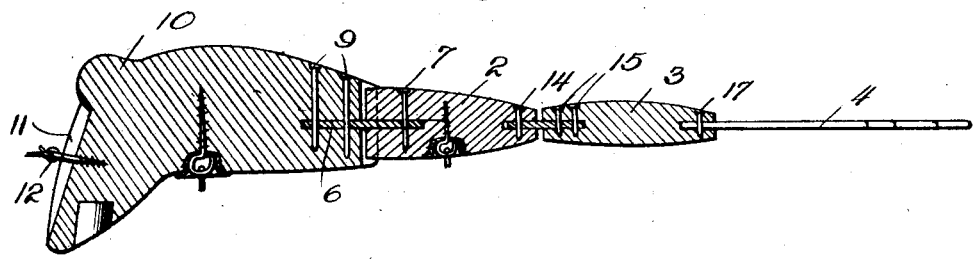
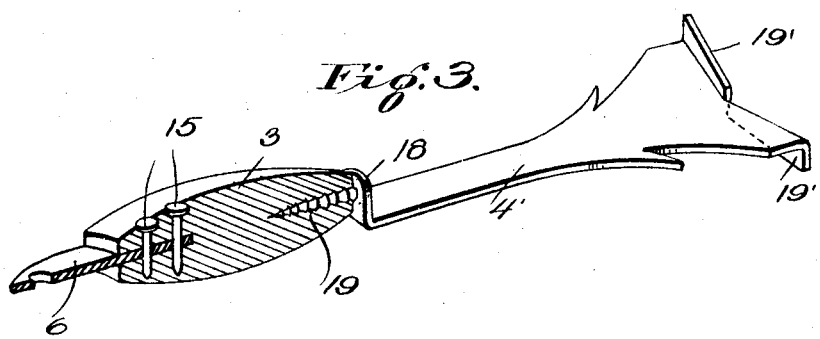
Inventor
Bert G. Goble
By Harold S. Huggins
Attorney

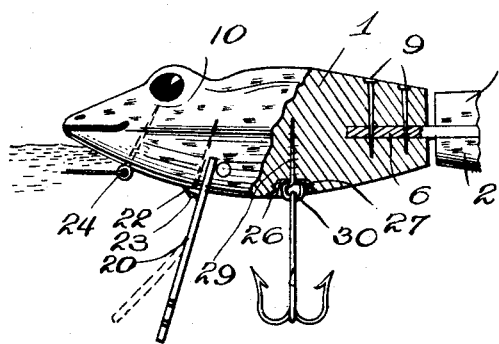
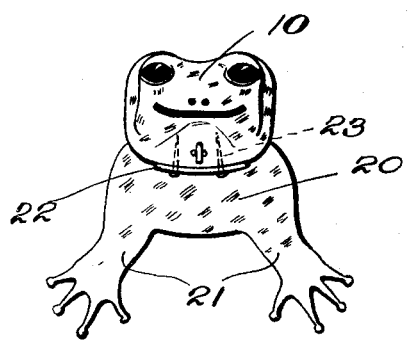
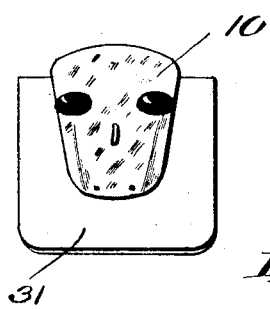
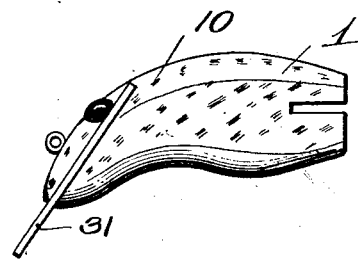
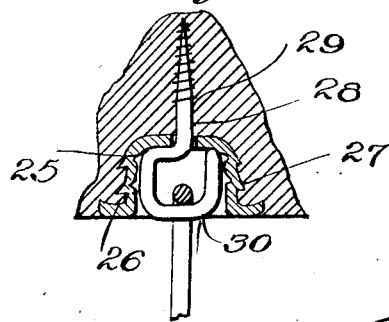

Patented Apr. 9, 1929.

1,708,015

UNITED STATES PATENT OFFICE.

BERT G. GOBLE, OF TULSA, OKLAHOMA.

ARTIFICIAL BAIT OR FROG.

Application filed November 1, 1924. Serial No. 747,383.

This invention relates to artificial bait and primarily to the type of bait which will float or submerge at the will of the fisherman and which will conform to the shape and color of a frog.

A divisional application of the present invention has been filed by the inventor. It bears the date of Feb. 11, 1929, Serial No. 338,918 and is entitled Artificial bait.

Objects of the invention are to provide an artificial bait so constructed that the forward body portion thereof will dodge or wobble back and forth through the water, thereby causing the legs to freely swing upon the pivoted joints and allow for free rotation or swinging movement of the feet, the effect of which resembles the lifelike movements of a frog swimming through the water; to provide an artificial bait having the features of a frog and provided with legs and feet which are held spaced apart a considerable distance to allow for free swinging movement of the leg sections and for rotating or swinging movement of the feet; to provide an artificial bait with a main body, leg sections and feet secured thereto, the leg sections having a forward member pivoted to the main body and which is of the spanner type construction thereby maintaining the rear leg sections and feet spaced a considerable distance apart at all times to allow for life-like movements of the bait when drawn through the water or when water flows by said bait; to provide an artificial frog having a head drooped below the horizontal plane of the body, and the head may be provided with a hollowed out portion to form a pocket for effecting a resistance when the bait is drawn through the water thereby giving the bait a wobble movement; to provide suitable means for connecting said parts together comprising plates and pins pivoted to central joints of the said parts; to provide an artificial frog bait having its head and forward portion of the body raised above the horizontal plane of the body, and provided upon the forward part of said body with a plate having the combined features of a dodger plate and legs and feet, to give the resemblance of the front legs and feet of a frog as well as affording a resistance for the bait when drawn through the water to give it a wobble movement; and to provide the body portion of the bait with cavities for reception of sockets pressed into the cavities, said sockets having projections for assisting in retaining the sockets in position when cooperated with hook retaining members so formed and constructed that they will hold the sockets in position.

Other objects and advantages of this invention will become more apparent as the description proceeds, the invention residing in the combination and arrangement of parts hereinafter fully described, illustrated in the accompanying drawings and scope in the appended claims.

Referring to the drawings, forming a part hereof, wherein like reference characters indicate corresponding parts throughout the several views, Figure 1 is a plan view of the present invention, showing the body, legs and feet connected in coordinate relation, Figure 2 is a longitudinal sectional view of the invention, showing more clearly the securing means for each part, Figure 3 is a detailed perspective view of one of the rear leg sections, showing the plate secured thereto, and the leg structure, Figure 4 is a side elevation, partly in section, of the bait, showing the head and forward part of the body raised above the horizonal plane of the body and the combined dodger and leg and feet plate secured thereto, Figure 5 is a front view of Figure 4, showing the formation of the plate, Figure 6 is a front view of a bait having the plate in the head which is drooped below the horizontal plane of the body, Figure 7 is a side elevation, showing the head below the horizontal plane of the body with the plate attached thereto, Figure 8 is a detailed sectional view of the hook retaining means, showing the sockets positioned in the body.

Referring more in detail to the drawings —1— represents the main body of the bait, —2— the spanner member. The spanner member comprises the rear part of the body or the hips and also the forward part of the legs, and is shown as an integral member of substantially semi-circular construction. This causes the ends to be spaced apart from each other and maintains the rear leg sections —3— and feet —4— and —4'— always spaced apart to allow for swing movement of the leg sections and swinging or rotating movement of the feet when the bait is drawn through the water. The spanner member —2— is provided with a semi-circular or arcuated slot —5— which allows for free swinging movement of the same upon the plate —6— which is pivotally secured as at —7— to the spanner —2—. The main body —1— is arcuated at its rear end in parallel relation to the spanner —2— and is provided with a slot —8— for receiving and rigidly securing the plate —6— at —9— thereto. The forward part of the body is provided with a head —10— which is drooped below the horizontal plane of the main body and legs and is provided with a recessed or hollowed out portion —11— thereby giving a sufficient resistance to the bait when drawn through the water, which causes the bait to wobble and resemble the life-like movements of a frog. Centrally located and secured within the hollowed out portion is a line receiving member —12—. The head is also weighted as shown at W in Figure 2.

Connected to the spaced ends of the spanner —2— are the rear leg sections —3—. The rear ends of the spanner are provided with suitable arcuated or semi-circular slots —13—, pivotally secured therein, as at —14—, are plates —6— which are rigidly secured to the leg sections —3—, as at —15—. The rear ends of the spanner —2—, being spaced apart, allow for free swinging movement of the leg sections —3— and will prevent them from coming into contact with each other when the bait is drawn through the water to give it a wobble movement and to resemble the life-like features of a frog.

The feet engaging ends of the leg sections —3— are provided with arcuated or semi-circular slots —16— adapted to receive the rear feet —4— of the frog, which are pivotally secured to the leg sections —3—, as at —17—. The feet —4— may be flat as shown in Figures 1 and 2, and are so formed as to resemble the feet of a frog with the toes painted to give the complete appearance. The feet may be constructed as shown in Figure 3 which provides a flat body portion 4' having an upright flange —18— at right angles to the flat body for engaging the ends of the rear leg sections —3— by means of a screw —19— passing through an orifice in the flange —18— and into the leg sections —3—. This allows for a rotating movement of the feet 4' when the bait is drawn through the water, and also allows the foot to flop around in any direction as this makes a ball socket joint which allows the foot to rotate on screw head —19— as well as allowing the same to wobble and the foot 4 can swing only back and forward in a horizontal plane. Upon the opposite end of the flat foot 4' there are flanges —19'— at an angle to the flat body and extending in opposite directions to each other. That is to say, one of the flanges extends upward and the other downward, thereby causing a propelling action of the same when the bait is drawn through the water. It is also desired to have the flanges —19'— taper inwardly, the highest point being at the outer edge and the lowest point being at the inner point of intersection. The speed with which the foot turns can be regulated as desired by the angle of the flange —19'—. In this form of foot construction, a novel feature is accomplished by painting the toes a bright color, to make them stand out from the dark background so it will resemble a foot from any direction when rotating.

The bait may be constructed along the lines indicated in Figure 4, where the head —10— is raised above the horizontal plane of the body —1— and is provided upon its under side with a plate —20— which serves a combined purpose, namely, that of a dodger plate for offering a resistance when the bait is drawn through the water and also giving the effect of front legs and feet —21—. The front feet being very noticeable when drawn through the water and presenting a dodging movement, present a life-life resemblance to a frog. This plate —20— has the feet and leg portions bent forwardly as indicated by the dotted lines in Figure 4. The plate has a recessed or cut away portion forming a flange —22— which is bent or turned at an angle to the main part of the plate —20— for the purpose of allowing this flange part —22— to be securely fastened to the under surface of the bait by screws or other suitable fastening means —23—. A line attaching element —24— is secured to the forward under side of the head in order to allow the line, when drawn through the water, to give the bait a wobble or dodging movement.

The bait is provided with any desired number of cavities —25— for receiving cup shaped sockets —26—, said sockets resting in the cavities and being flush with the outer surface of the body of the bait. The sockets —26— have outstruck portions or protuberances —27— for engaging the sides of the cavities and assisting in securely retaining them in position. An orifice —28— is provided at the closed end of the sockets for allowing the screw threaded hook receiving member —29— to pass therethrough and engage the body of the bait. The hook receiving member is formed at its outer end with an eye construction —30— which rests within the socket —26— and when the member —29— is threaded into the body of the bait, the eye —30— will bear against the bottom evenly at the two places opposite each other the one being the point and the other being the turn of the eye, as shown in Figure 8, and side walls of the socket and thereby retain it in secure position.

The bait, if desired, may have its head drooped below the horizontal plane of the body as indicated in Figures 6 and 7. A plate —31— may be securely attached within the mouth of the bait so as to afford a dodging wobbling movement of the bait when drawn through the water.

A novel and advantageous construction has been hereindescribed and will overcome the great disadvantages as now experienced in the prior artificial bait art. The disadvantages of the artificial baits now in use are many and principally that of having the swinging leg and feet sections becoming entangled in each other, which necessitates the removal of the line from the water and time spent in separating the entangled sections.

The present construction overcomes this difficulty by providing the leg sections in two portions. The one portion which constitutes the rear part of the body or the hips and the forward part of the legs is of a spanner type construction. Being an integral member and semi-circular in shape, it allows the ends to be spaced a considerable distance apart. When the rear leg sections are pivotally connected to the ends of this spanner section, they are spaced a considerable distance apart thereby allowing for swinging movement but being sufficiently spaced apart to prevent them from entangling with each other. It will thus be seen that when the feet are secured to the rear leg sections they can either rotate or swing freely without becoming entangled in each other.

By having the head drooped below the horizontal plane of the body and recessed as described or provided with the dodger plate, it will afford a suitable resistance to the bait when it is drawn through the water, thereby giving a wobble and dodging movement thereto and allowing for life-like movement of the leg and feet sections.

It is to be understood that while the invention as illustrated in the accompanying drawings and description is the preferred embodiment thereof, minor changes may be made without departing from the spirit and scope of the appended claims.

What is claimed as new is:

1. An artificial fish lure comprising a main body, a spanner member constituting the rear part of said body and the forward part of the legs, leg and foot sections, means for joining said sections, said spanner member being so connected to the main body as to allow for swinging movement of the same.

2. An artificial frog bait consisting of a main body, a spanner member pivoted thereto, leg sections pivotally connected to said spanner, feet connected to said leg sections and a plate in the forward part of the main body to cause resistance when drawn through the water.

3. A fish lure including a main body, a spanner section pivotally secured thereto, leg sections pivotally secured to said spanner section and feet connected to the leg sections for swinging movement when drawn through the water.

4. An artificial bait comprising a main body, leg sections, feet connected thereto for swinging movement, a spanner member pivotally connected to the main body and leg sections whereby said leg sections and feet will be spaced apart to allow for swinging and life-like movement of said bait when the same is drawn through the water.

In testimony whereof I hereunto affix my signature.

BERT G. GOBLE.